(12) United States Patent
Paterson et al.

(10) Patent No.: US 12,074,911 B1
(45) Date of Patent: *Aug. 27, 2024

(54) SYSTEMS AND METHODS FOR NETWORK SECURITY

(71) Applicant: United Services Automobile Association (USAA), San Antonio, TX (US)

(72) Inventors: Kevin Glynn Paterson, San Antonio, TX (US); Neelsen Cyrus, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 518 days.

This patent is subject to a terminal disclaimer.

(21) Appl. No.: 17/087,323

(22) Filed: Nov. 2, 2020

Related U.S. Application Data

(63) Continuation of application No. 16/586,151, filed on Sep. 27, 2019, now Pat. No. 10,826,944, which is a continuation of application No. 16/144,725, filed on Sep. 27, 2018, now Pat. No. 10,469,535, which is a continuation of application No. 15/137,811, filed on Apr. 25, 2016, now Pat. No. 10,116,699.

(Continued)

(51) Int. Cl.
  *H04L 9/40* (2022.01)
(52) U.S. Cl.
  CPC .......... *H04L 63/20* (2013.01); *H04L 63/0876* (2013.01); *H04L 63/101* (2013.01); *H04L 63/1408* (2013.01); *H04L 63/1491* (2013.01)

(58) Field of Classification Search
  CPC ... H04L 63/20; H04L 63/0876; H04L 63/101; H04L 63/1408; H04L 63/1491
  See application file for complete search history.

(56) References Cited

U.S. PATENT DOCUMENTS 7,032,026 B1 * 4/2006 Biswas ............... H04L 63/0876
  709/219
8,656,465 B1   2/2014 Fong-Jones
(Continued)

OTHER PUBLICATIONS

Wang, Rui, et al. "Unauthorized origin crossing on mobile platforms: Threats and mitigation." Proceedings of the 2013 ACM SIGSAC conference on Computer & communications security. 2013. (Year: 2013).*

(Continued)

*Primary Examiner* — Theodore C Parsons
*Assistant Examiner* — Sameera Wickramasuriya
(74) *Attorney, Agent, or Firm* — Fletcher Yoder, P.C.

(57) ABSTRACT

Enhanced electronic security systems and methods are provided. A whitelist, blacklist, or both of resource access sources that are allowed to use a particular resource access account are obtained. Upon detecting an access attempt to a particular resource on a computer network, a source of the access attempt and a resource access account used in the access attempt is identified. The whitelist, blacklist, or both are referenced to determine if the source of the access attempt is allowed to use the resource access account used in the access attempt. When the source of the access attempt is not allowed to use the resource access account used in the access attempt, one or more mitigation tasks may be performed.

20 Claims, 3 Drawing Sheets

Related U.S. Application Data

(60) Provisional application No. 62/181,071, filed on Jun. 17, 2015.

(56) References Cited

U.S. PATENT DOCUMENTS

| | | | |
|---|---|---|---|
| 8,788,419 | B2 | 7/2014 | Samuels et al. |
| 9,021,594 | B2 | 4/2015 | Choi et al. |
| 9,026,597 | B1 | 5/2015 | Emigh et al. |
| 9,055,093 | B2 | 6/2015 | Borders |
| 11,138,605 | B2* | 10/2021 | Aabye ............... G06Q 20/027 |
| 2005/0018833 | A1* | 1/2005 | Wang ................ H04M 7/0033 |
| | | | 379/215.01 |
| 2005/0060566 | A1* | 3/2005 | Chebolu ............. H04L 67/34 |
| | | | 726/27 |
| 2005/0198173 | A1 | 9/2005 | Evans |
| 2006/0242694 | A1 | 10/2006 | Gold et al. |
| 2008/0289028 | A1* | 11/2008 | Jansen ............. H04L 63/0281 |
| | | | 726/11 |
| 2009/0288150 | A1 | 11/2009 | Toomim et al. |
| 2011/0265145 | A1 | 10/2011 | Prasad et al. |
| 2012/0276867 | A1 | 11/2012 | McNamee et al. |
| 2013/0007058 | A1 | 1/2013 | Meredith et al. |
| 2013/0013507 | A1* | 1/2013 | Browning ........... G06Q 20/405 |
| | | | 705/44 |
| 2013/0139073 | A1 | 5/2013 | Crames et al. |
| 2013/0247149 | A1* | 9/2013 | Sanft ................. H04L 63/101 |
| | | | 726/4 |
| 2013/0305357 | A1* | 11/2013 | Ayyagari ............ H04L 41/069 |
| | | | 726/22 |
| 2013/0341396 | A1* | 12/2013 | Tung ................. G06F 13/385 |
| | | | 235/382 |
| 2013/0346608 | A1* | 12/2013 | Tung ................... H04L 63/20 |
| | | | 709/225 |
| 2014/0283109 | A1 | 9/2014 | Quong |
| 2014/0310358 | A1 | 10/2014 | Pignataro et al. |
| 2015/0012976 | A1 | 1/2015 | Milder |
| 2015/0121526 | A1* | 4/2015 | McLarnon ............ G06F 21/56 |
| | | | 726/23 |
| 2015/0135285 | A1 | 5/2015 | Boro et al. |
| 2015/0156203 | A1 | 6/2015 | Giura et al. |
| 2015/0180829 | A1* | 6/2015 | Yu .................... H04L 63/083 |
| | | | 726/11 |
| 2015/0281070 | A1 | 10/2015 | Liljenstolpe |
| 2016/0182454 | A1 | 6/2016 | Phonsa et al. |
| 2016/0210627 | A1 | 7/2016 | Little |
| 2016/0212636 | A1 | 7/2016 | Dimou et al. |
| 2020/0059475 | A1 | 2/2020 | Kendall et al. |

OTHER PUBLICATIONS

Kang, JungMin, and DoHoon Lee. "Advanced white list approach for preventing access to phishing sites." 2007 International Conference on Convergence Information Technology (ICCIT 2007). IEEE, 2007. (Year: 2007).*

* cited by examiner

SYSTEMS AND METHODS FOR NETWORK SECURITY

CROSS REFERENCE TO RELATED APPLICATIONS

This application is a continuation of U.S. patent application Ser. No. 16/586,151, entitled, "SYSTEMS AND METHODS FOR NETWORK SECURITY," filed Sep. 27, 2019, which is a continuation of U.S. patent application Ser. No. 16/144,725, entitled, "SYSTEMS AND METHODS FOR NETWORK SECURITY," filed Sep. 27, 2018, which is a continuation of U.S. patent application Ser. No. 15/137,811, entitled, "SYSTEMS AND METHODS FOR NETWORK SECURITY," filed Apr. 25, 2016, which claims priority to and the benefit of U.S. Provisional Application No. 62/181,071, entitled "SYSTEMS AND METHODS FOR NETWORK SECURITY," filed Jun. 17, 2015, each of which is hereby incorporated by reference in its entirety for all purposes.

BACKGROUND

The present disclosure relates generally to network security. More specifically, the present disclosure relates to mitigating risk associated with unauthorized use of resource access accounts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Generally speaking, embodiments provided herein relate to detecting unauthorized use of accounts useful for accessing one or more resources (e.g., data, computers, etc.) In certain embodiments, a listing of access sources may be generated that provide a list (e.g., a whitelist) of permitted sources that may use an associated resource access account. When a resource access request using the resource access account is sourced from an entity that is not specified in the whitelist, the system may determine that there is an unauthorized use of the resource access account and may provide risk mitigation to protect resources of the system.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The information age has brought about rapid advancements in telecommunication, hardware-based computing, software, and other data related activities. Thus, the current information-based society has resulted in the generation of a vast amount of valuable digital resources that should be protected from public consumption. For example, many organizations may retain a significant amount of personal and/or sensitive digitized data and/or machines within the organizations. Further, organizations have become more connected, utilizing sophisticated networks of computers that, in some cases, may be accessed remotely from a number of access points. Unfortunately, this increased utilization of sensitive resources along with the increase in connectivity/access points to these sensitive resources has increased the risk of unauthorized access to the resources.

Figure 1:
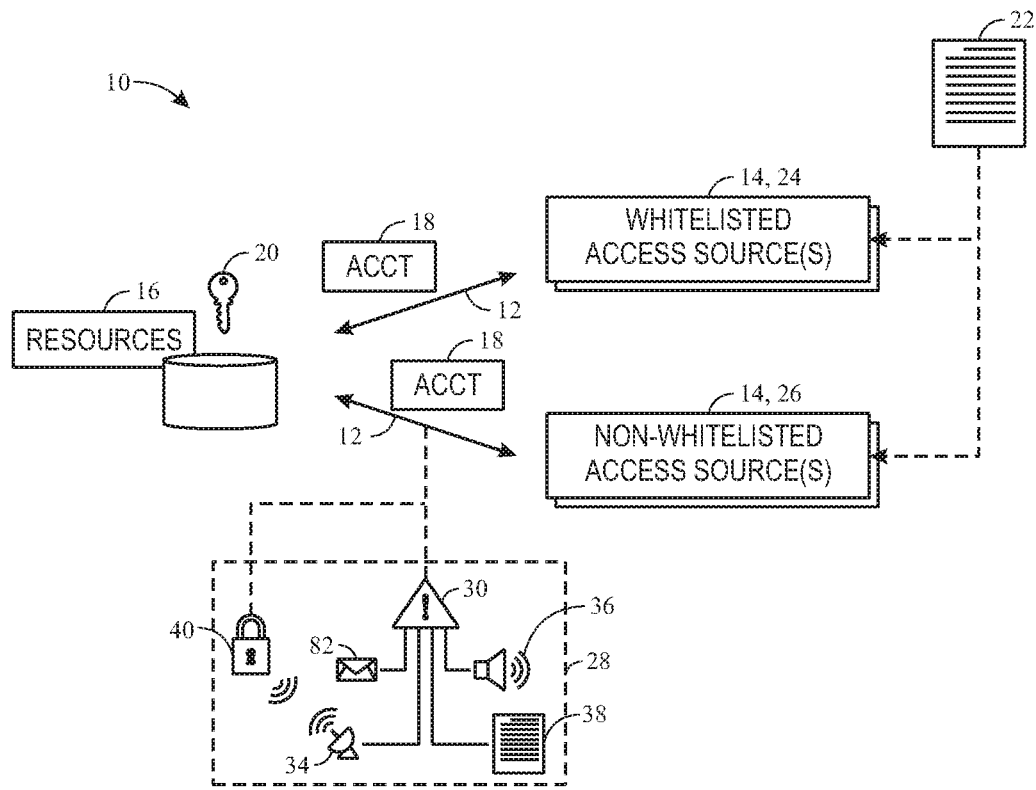
FIG. 1 illustrates a block diagram of a network security risk mitigation system, in accordance with certain embodiments described herein.

Accordingly, as discussed above, new techniques may be implemented to mitigate risk of unauthorized access to one or more resources. By way of introduction, FIG. 1 illustrates a block diagram of a network security risk mitigation system 10, in accordance with certain embodiments described herein. Generally speaking, the network security risk mitigation system 10 may include a computer network 12 that connects access sources 14 to one or more protected resources 16 (e.g., computer systems, file systems, electronic data, etc.). For example, the computer network 12 may, in some embodiments be an Ethernet network (or other computer network technology) that utilizes the Transmission Control Protocol (TCP), Internet Protocol (IP), and/or any other networking protocol.

The access sources 14 may include any number of computing devices such as a general-purpose computer, a mobile computing device, a laptop-computing device, a tablet computing device and the like. The access sources 14 may access the resources 16 using a resource access account 18 that is associated with one or more permissions 20 to access the resource 16. For example, a permission 20 may dictate that the account 18 has read access, write access, or both to the resource 16.

As mentioned above, from time-to-time, the resource access accounts 18 may become compromised. For example, unpermitted sharing of the resource access accounts 18, data breaches of the system 10, or both may lead to unintended possession of the resource access account 18. Thus, additional avenues of protection for such unintended possession may be desirable. Accordingly, a whitelist definition 22 may provide an indication of particular access sources 14 (e.g., whitelisted access sources 24) that may acquire access to the resources 16 using the resource access account 18. Accordingly, the whitelist definition 22 may also indirectly define access sources 14 (e.g., non-whitelisted access sources 26), as any access source 14 not described in the whitelist definition 22 is a non-whitelisted access source 26.

In some embodiments, critical login accounts may be protected using a whitelist definition 22. For example, the resource access accounts 18 may be critical login accounts associated with particular resources 16. Critical login accounts may describe accounts that may be used at a plurality of access sources 14 and/or resources 16, such as all servers running a particular operating system (e.g., Microsoft Windows) in the system 10. These critical login accounts may cause particular vulnerabilities in the system 10, because compromise of a single account may result in unauthorized access of a multitude of resources 16 (e.g., all servers running a particular operating system). Utilizing the techniques mentioned herein, such vulnerabilities may be mitigated. For example, in such embodiments, it may be known that only a select subset of the resource access accounts 18 that have been provisioned with a particular critical login account should actually use the critical login account. Thus, the select subset of the resources accounts 18 may be in the whitelist definition 22, while the other sources may be blacklisted (e.g., not in the whitelist definition 22).

In alternative embodiments, a blacklist definition may be used in place of the whitelist definition 22. For example, the blacklist definition could specifically indicate particular non-whitelisted access sources 26, indirectly defining all other access sources 14 as whitelisted sources 24.

Once the system 10 is aware of the whitelisted access sources, the system 10 may mitigate the risk of unintended possession of resource access accounts 18 by initiating certain risk mitigation tasks 28 upon determining that a non-whitelisted access source 26 is attempting to access (or has accessed) resources 16 via the resource access account 18. For example, in some embodiments, one or more alerts 30 may be generated to provide a notification regarding the unauthorized attempt to access the resources 16. For example, electronic notifications 32, such as email or short message service (SMS) text messages may be provided to security personnel or other individuals associated with the resources 16. In some embodiments, the alerts 30 may include two-way communications 34, such as cellular telephone calls. Audible and/or visual alerts 36 may also provide an indication of the unauthorized resource access 16. For example, an audible alert may be presented via an intercom system and/or a visual indication may be presented via an overhead lighting system. In some embodiments, the audible and/or visual alerts 36 may be facilitated by use of a graphical user interface (GUI) of a resource 16 monitoring software. In some embodiments, the alert 30 may include one or more reports 38 of recent unauthorized access and/or repeated unauthorized access.

Additionally and/or alternatively, the system 10 may implement mitigation tasks 28 related to security features 40 of the resources 16. For example, in some embodiments, a first attempted access to the resources 16 may be granted despite the request coming from a non-whitelisted access source 26. However, upon subsequent unauthorized access attempts (or after a threshold number of subsequent unauthorized access attempts), the system 10 may: restrict access from the non-whitelisted access sources 26, disable the account 18, or both. In alternative embodiments, access to the resource 16 may be denied immediately upon determining that the access was sourced from a non-whitelisted access source 26.

In some embodiments, the system may redirect access attempts from non-whitelisted access sources 26 to a honeypot. A honeypot is a trap that is used to detect, deflect, or otherwise counteract attempts to commit unauthorized access to the system 10. The honeypot may enable the system 10 and/or personnel associated with system 10 to monitor the access to determine particular characteristics, such as hacking techniques, particular resources 16 that hackers are attempting to access, etc.

In some embodiments, particular security mitigation tasks 28 may be implemented based upon one or more factors of the system 10. For example, when a heightened security mode is initiated in the system 10 and/or the resources 16 being access are sensitive (e.g., personal data rather than anonymized data), more strict mitigation tasks 28 may be used. For example, immediate denial of access to the resources 16 may be implemented rather than providing a threshold of allowed accesses prior to denying access.

Figure 2:
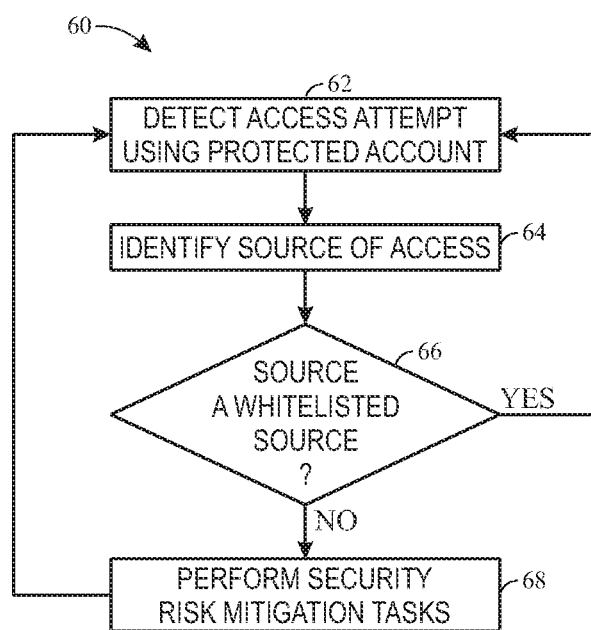
FIG. 2 illustrates a flowchart describing a process for mitigating risk on a computer network, in accordance with certain embodiments described herein.

To perform some of the actions set forth above, one or more unauthorized access monitoring processes may be implemented. FIG. 2 illustrates a flowchart describing a process 60 for mitigating risk on a computer network, in accordance with certain embodiments described herein. The process 60, along with all other processes described herein, may be a machine-implemented process that is implemented by a processor using one or more machine-readable instructions. The machine-readable instructions may be stored on a tangible, non-transitory, machine readable medium.

The process 60 begins by detecting an access attempt using the resource access account (block 62). For example, as mentioned above the resource access account 18 may be critical login accounts that are used across a multitude of sources and/or resources 16.

Access attempts may be determined by the system in a variety of ways. For example, network traffic monitoring may intercept such access requests, the resource (or a host of the resource) being accessed may detect the access attempt, or periodic monitoring of activity logs of the resource and/or a host of the resource may be monitored to observe past access attempts.

Next, the source of the access attempt is identified (block 64). For example, in some embodiments, an Internet Protocol (IP) address may be used to identify the source. Additionally and/or alternatively, a media access control (MAC) address or other available unique identifier associated with the source may be used to identify the source. Further, in some embodiments, additional data may be used to determine particular whitelisted sources 24. In certain embodiments, time thresholds, time ranges, etc. may be used to alter a set of whitelisted access sources 24. For example, a whitelist rule may dictate that a particular access source 14 is whitelisted for use of a particular account 18 (e.g., a critical account login) during a workday (e.g., 8:00 AM-5:00 PM, Monday-Friday), during off-peak hours (e.g., 8:30 PM-6:00 AM), during a particular time period (e.g., 12:01 AM-1:45 AM), etc. Accordingly, the whitelisted access sources 24 may be quite fluid, creating unpredictability for hackers, which may result in strengthening the security of the system 10.

From there, a determination is made as to whether the identified source is whitelisted (e.g., is in the whitelist definition 22 of FIG. 1, is not listed in a blacklist, or both) (decision block 66). For example, a query of a whitelist (e.g., a database, data file, etc.) may search for the IP address, MAC address and/or other available unique identifier used to identify the source of the access attempt.

If the source is whitelisted, monitoring continues (block 62) without any risk mitigation. However, when the query indicates that the source is not defined as a whitelisted access source 24 (e.g., is a non-whitelisted access source 26), one or more risk mitigation tasks may be performed (block 68). For example, as discussed above, one or more alerts, 30 may be triggered and/or one or more security 40 features may be activated. Alerts 30 may, in some embodiments, include electronic messages 32, two-way communications 34, audible and/or visual alarms 36, and/or reporting 38. Further the security features 40 may limit access to the resource 16 and/or redirect the access attempt to a honeypot for further observation.

Figure 3:
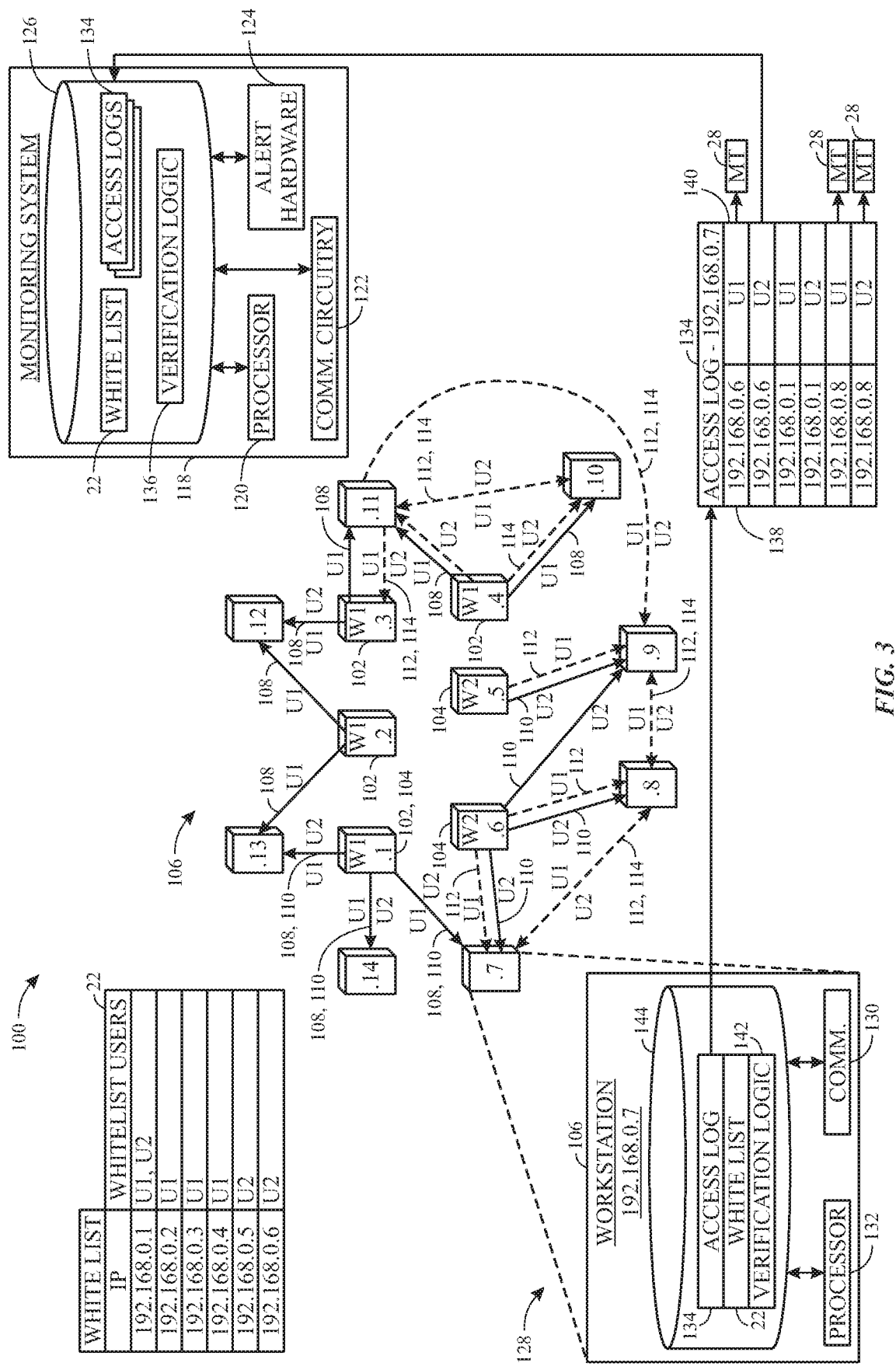
FIG. 3 illustrates an example of a computer network that has implemented the process for mitigating risk, as described in FIG. 2, in accordance with certain embodiments described herein.
Figure 4:
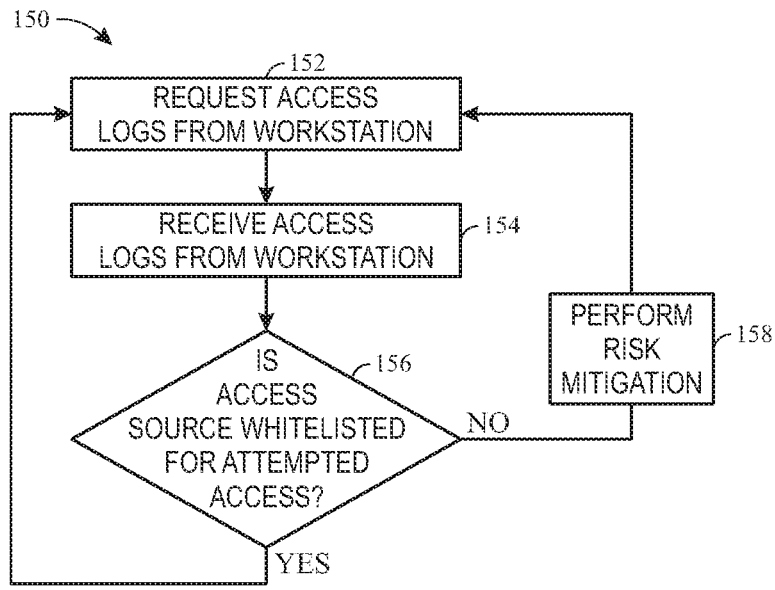
FIG. 4 illustrates a flowchart describing a process for mitigating risk at the monitoring system of FIG. 3, in accordance with certain embodiments.
Figure 5:
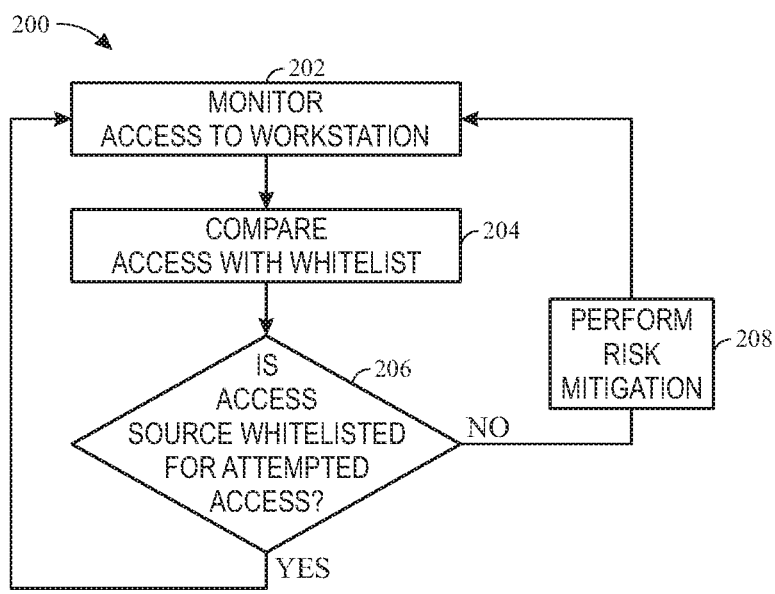
FIG. 5 illustrates a flowchart describing a process for mitigating risk at the workstations of FIG. 3, in accordance with certain embodiments.

Turning now to a more detailed discussion of particular techniques for mitigating risk of unauthorized access of resources, FIG. 3 illustrates an example of a computer network (e.g., system 100) that has implemented the process 60 for mitigating risk of FIG. 2, in accordance with certain embodiments described herein. Multiple systems may monitor and mitigate risks associated with unauthorized access. FIG. 4 illustrates a flowchart describing a process for mitigating risk at the monitoring system of FIG. 3, in accordance with certain embodiments. Additionally and/or alternatively, FIG. 5 illustrates a flowchart describing a process for mitigating risk at the workstations of FIG. 3, in accordance with certain embodiments. For simplicity, FIGS. 3-5 will be discussed together.

As previously discussed, the system 10 of FIG. 1 may include whitelisted sources 24 and non-whitelisted sources 26. For simplicity, the discussion in FIG. 1 revolved around a single account 18 with associated whitelisted access sources 24. However, in some embodiments, additional accounts may be present, these accounts sharing the same whitelisted access sources or having an independent set of whitelisted access sources. In the system 100, two protected user accounts "U1" and "U2" are monitored in accordance with the process 60 of FIG. 2. Protected user accounts "U1" and "U2" include separate whitelisted sources, which are defined in the whitelist definition 22. For example, the whitelist definition 22 may be a database or data file that indicates that IP addresses 192.168.0.1-192.168.0.4 are whitelisted access sources 102 for usage of protected user account "U1." Additionally the whitelist definition 22 indicates that IP addresses 192.168.0.1, 192.168.0.5, and 192.168.0.6 are whitelisted access sources 104 for protected user account "U2." To illustrate, the workstations 106 have been labeled with the last number associated with the workstation's IP address, where each of the workstations 106 have a IP address leading with 192.168.0. Accordingly, the workstation 106 labeled "0.1" refers to the workstation 106 having the IP address 192.168.0.1.

The communication arrows between each of the workstations 106 indicate whether the access request will invoke risk mitigation tasks. For example, a solid directional arrow having an associated "U1" (e.g., arrow 108) illustrates that no mitigation tasks will be invoked by requesting access using the "U1" account from the workstation 106 at the base of the arrow to the workstation 106 at the tip of the arrow. Likewise, a solid directional arrow having an associated "U2" illustrates that no mitigation tasks will be invoked by requesting access using the "U2" account from the workstation 106 at the base of the arrow to the workstation 106 at the tip of the arrow. Broken directional arrows having an associated "U1" (e.g., arrow 112) illustrate that mitigation tasks will be invoked by requesting access using the "U1" account from the workstation 106 at the base of the arrow to the workstation 106 at the tip of the arrow. Likewise, broken directional arrows having an associated "U2" (e.g., arrow 114) illustrate that mitigation tasks will be invoked by requesting access using the "U2" account from the workstation 106 at the base of the arrow to the workstation 106 at the tip of the arrow.

Thus, for example, in accordance with the process 60 of FIG. 2, transactions from workstations 106 will be monitored according to the whitelist definition 22. Some workstations 106 are white listed for use of one protected user account, but not the other. For example, transactions sourced by the workstation 106 labeled 0.2 using protected user account "U1" will not trigger mitigation tasks, because 192.168.0.2 is whitelisted for use of "U1." However, if this workstation attempted to gain access to a resource using "U2," a mitigation task would be triggered, because 192.168.0.2 is not white listed for use of "U2."

In some scenarios particular workstations may be whitelisted for use of multiple or all accounts. For example the workstation 106 labeled 0.1 is whitelisted for use of both accounts "U1" and "U2." Accordingly, any access requests sourced from this workstation using either "U1" or "U2" will not result in mitigation tasks.

Sometimes, particular workstations 106 are not whitelisted for use of any accounts. For example, the workstation labeled 0.9 is not whitelisted to use either "U1" or "U2." Accordingly, any access request sourced from this workstation 106 using "U1" or "U2" will trigger a mitigation task.

The system 100 also includes a monitoring system 118. The monitoring system 118 may track workstations 106 for security violations, performance, etc. to ensure efficient and protected operation of the workstations 106. The monitoring system 118 may include a processor 120, communications circuitry 122, alert hardware 124, and/or tangible, non-transitory storage 126. As previously discussed, the workstations 106, the monitoring system 118, or both may provide the whitelist monitoring functionality. FIG. 4 illustrates a flowchart describing a process 150 for mitigating risk at the monitoring system 118 of FIG. 3, in accordance with certain embodiments. The process 150 may begin by requesting access logs from one or more of the workstations 106 (block 152). In some embodiments, it may be preferable to obtain access logs for each of the workstation in the system. Referring back to FIG. 3, the monitoring system 118 may provide the request via communication circuitry 122 to the workstations 106. As indicated by the expanded detail 128 of the workstation 106 having the IP address 192.168.0.7, the workstations 106 may include communications circuitry 130 and a processor 132 that may facilitate the provision of access logs 134 to the monitoring system 118. The access logs 134 may be received by the monitoring system 118 (block 154).

The monitoring system 118 may have access to a copy of the whitelist definition 22. For example, as illustrated in FIG. 3, a copy of the whitelist definition 22 is stored in the storage 126. In certain embodiments, the monitoring system 118 may use the processor 120 and/or communications circuitry 122 to obtain the whitelist definition 22 from an external source.

Verification logic 136 (e.g., instructions implemented by the processor 120) may determine if the sources 138 and user accounts 140 provided in the access logs 134 correlate to whitelisted sources (decision block 156). For example, in the expanded access log of the workstation 106 having IP address 192.168.0.7, the verification logic may determine that the access attempt from 192.168.0.6 using "U1" and the access attempt from 192.168.0.8 using both "U1" and "U2" should trigger mitigation tasks 28. Accordingly, mitigation tasks may be performed when the access source is not whitelisted (block 158). Otherwise, monitoring may periodically be re-implemented (starting at block 152).

Additionally and/or alternatively, FIG. 5 illustrates a flowchart describing a process 200 for mitigating risk at the workstations 106 of FIG. 3, in accordance with certain embodiments. In such embodiments, the process 200 begins by monitoring access to the workstation 106 (block 202). For example, the workstations 106 may use their own locally stored access logs 134 and/or incoming data packets (e.g., external data accessing the communication circuitry 130) to determine if non-whitelisted access sources are attempting to access the workstation 106.

Upon identifying the access source (e.g., via the sources 138 of access log 134 or an identifying signature in the incoming data packets) and the account 18 being used to attempt access, the workstations 106 may compare the access source identity and account with the whitelist definition 22 (block 204). The whitelist definition 22 may be stored locally at the workstation 106 or may be downloaded and/or accessed remotely (e.g., via the communication circuitry 130).

Verification logic 142 (e.g., processor 132-implemented instructions stored in tangible, non-transitory storage 144) may determine if the access source is whitelisted for the attempted access (decision block 206). For example, the verification logic may query the whitelist definition 22 for the particular source identity and account combination. If the access source is whitelisted, monitoring may continue (block 202).

Otherwise, if the access source is not whitelisted, mitigation tasks may be performed (block 208). In some embodiments, the mitigation tasks may trigger a command to perform an activity on a separate machine. For example, the workstation 106 may command an alert to be presented at the monitoring system 118 (e.g., via the alert hardware 124, such as a display for visual alerts and/or a speaker for audible alerts).

As may be appreciated, by applying the techniques provided in processes 60, 150, and/or 200, awareness of network access and security may be enhanced. Indeed, these techniques may provide increased security by including an additional layer of monitoring that hackers may be unable to detect. By keeping the whitelist definition secret, hackers and others attempting unauthorized access will not know which servers are whitelisted. Additionally, use of particular accounts (e.g., critical login accounts) from a particular source may be whitelisted for a particular time (e.g., a time range (e.g., 12:00 AM-6:30 AM), duration (e.g., 3 hours from the beginning of the whitelisting), etc.). Further, from time to time (e.g., daily, weekly, monthly, etc.) the whitelist definition may be altered, such that the whitelisted servers remain undetectable. Thus, unauthorized users will be unable to circumvent attempted access from non-whitelisted sources. Accordingly, as access is attempted from these non-whitelisted sources, these perpetrators may be quickly discovered and mitigation measures may be implemented.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A monitoring system comprising:
    a memory; and
    one or more processors configured to:
        identify a set of sources from which a particular resource access account is permitted to access a particular resource on a computer resource;
        obtain a subset of the set of sources as a whitelist;
        alter the whitelist periodically to enable the whitelist to remain undetectable over time;
        detect an access attempt to the particular resource;
        identify a resource access account used in the access attempt and a source from which the access attempt originated;
        determine whether the source is allowed to use the resource access account to access the particular resource by referencing the whitelist; and
        in response to determining that the source is not allowed to use the resource access account to access the particular resource, perform one or more mitigation tasks based upon use of the resource access account by the source.

2. The monitoring system of claim 1, wherein the one or more processors are configured to allow the access attempt in response to determining that the source is allowed to use the resource access account to access the particular resource.

3. The monitoring system of claim 1, wherein the resource access account comprises a critical login account that has access to a plurality of computer resources.

4. The monitoring system of claim 1, wherein the one or more processors are configured to operate in:
    a lessened security mode in which the one or more mitigation tasks are performed after a threshold number of unauthorized access attempts; and
    a heightened security mode in which the one or more mitigation tasks are immediately performed after a single unauthorized access attempt.

5. The monitoring system of claim 1, wherein the one or more processors are configured to perform the one or more mitigation tasks by restricting access to the particular resource by the source.

6. The monitoring system of claim 1, wherein the one or more processors are configured to perform the one or more mitigation tasks by providing an output indicative of a non-whitelisted access attempt.

7. The monitoring system of claim 1, wherein the one or more processors are configured to:
    determine permitted times of use of corresponding resource access accounts to access the particular resource; and perform the one or more mitigation tasks when the access attempt to the particular resource used the corresponding resource access accounts outside of the permitted times.

8. The monitoring system of claim 7, wherein the one or more processors are configured to periodically alter the permitted times of use of the corresponding resource access accounts to enable the whitelist to remain undetectable over time.

9. The monitoring system of claim 1, wherein the one or more processors are configured to identify the source by determining an Internet Protocol (IP) address of the source or a media access control (MAC) address associated with the source.

10. A method of operating a monitoring system, the method comprising:
identifying, via one or more processors of the monitoring system, a set of sources from which a particular resource access account is permitted to access a particular resource on a computer resource;
obtaining, via the one or more processors, a subset of the set of sources as a whitelist;
altering, via the one or more processors, the whitelist periodically to enable the whitelist to remain undetectable over time;
detecting, via the one or more processors, an access attempt to the particular resource;
identifying, via the one or more processors, a resource access account used in the access attempt and a source from which the access attempt originated;
determining, via the one or more processors, that the source is not allowed to use the resource access account to access the particular resource by referencing the whitelist; and
performing, via the one or more processors, one or more mitigation tasks based upon use of the resource access account by the source.

11. The method of claim 10, wherein the whitelist indirectly defines a blacklist of sources that are not allowed to use the particular resource access account to access the particular resource.

12. The method of claim 10, wherein detecting the access attempt to the particular resource comprises identifying the access attempt from an access log, and wherein the access log comprises a set of sources that have attempted to access one or more resources and corresponding resource access accounts used by the set of sources in an attempt to access the one or more resources.

13. The method of claim 10, comprising identifying the source by determining an Internet Protocol (IP) address of the source or a media access control (MAC) address associated with the source.

14. The method of claim 10, wherein altering the whitelist periodically to remain undetectable over time comprises:
altering at least one source of the whitelisted sources that are allowed to use the particular resource access account; or
altering a permitted time period during which at least one source of the whitelisted sources are allowed to use the particular resource access account.

15. The method of claim 10, wherein the whitelist comprises a permitted time period as to when at least one source of the whitelisted sources are allowed to use the particular resource access account; and
wherein the method comprises:
determining, by referencing the whitelist, that the at least one source is not allowed to use the resource access account at a particular time based upon the permitted time period; and
performing the one or more mitigation tasks in response to determining that the at least one source is not allowed to use the resource access account at the particular time.

16. The method of claim 10, wherein the one or more mitigation tasks are performed by:
restricting access to the particular resource by the source;
providing a two-way communication message indicating a non-whitelisted access attempt;
providing an output indicative of the non-whitelisted access attempt; or
any combination thereof.

17. A tangible, non-transitory, machine-readable medium, comprising machine-readable instructions that, when executed by one or more processors, cause the one or more processors to:
identify a set of sources from which a particular resource access account is permitted to access a workstation;
obtain a subset of the set of sources as a whitelist;
alter the whitelist periodically to enable the whitelist to remain undetectable over time;
detect at least one access attempt to the workstation;
determine if a source that attempted to access the workstation used a permitted resource access account in the access attempt by referencing the whitelist; and
perform one or more mitigation tasks based upon at least one access attempt performed by the source without using a permitted resource access account.

18. The tangible, non-transitory, machine-readable medium of claim 17, wherein the machine-readable instructions are configured to cause the one or more processors to provide access to the workstation from the source that attempted to access the workstation when the source used a permitted resource access account in the access attempt.

19. The tangible, non-transitory, machine-readable medium of claim 17, wherein the machine-readable instructions are configured to cause the one or more processors to determine if the source that attempted to access the workstation used a permitted resource access account in the access attempt at a particular permitted time by referencing the whitelist, wherein the whitelist provides an indication of the particular permitted time.

20. The tangible, non-transitory, machine-readable medium of claim 17, wherein the machine-readable instructions are configured to cause the one or more processors to periodically alter the whitelist to remain undetectable over time by:
altering at least one source of the whitelisted sources that are allowed to use the particular resource access account; or
altering a permitted time period during which at least one source of the whitelisted sources are allowed to use the particular resource access account.

* * * * *